United States Patent [19]
Kerr

[11] Patent Number: 5,844,600
[45] Date of Patent: Dec. 1, 1998

[54] METHODS, APPARATUS, AND SYSTEMS FOR TRANSPORTING MULTIMEDIA CONFERENCE DATA STREAMS THROUGH A TRANSPORT NETWORK

[75] Inventor: Gordon Kerr, Quebec, Canada

[73] Assignee: General DataComm, Inc., Middlebury, Conn.

[21] Appl. No.: 529,009

[22] Filed: Sep. 15, 1995

[51] Int. Cl.$^6$ ................................................ H04N 7/15
[52] U.S. Cl. .............................. 348/17; 348/15; 370/260
[58] Field of Search ................................. 348/15, 17, 18, 348/19, 14, 16; 379/202, 96, 94, 93.08, 93.14, 93.21; 370/62, 260, 265

[56] References Cited

U.S. PATENT DOCUMENTS

| 5,428,608 | 6/1995 | Freeman et al. | 379/93 |
| 5,467,342 | 11/1995 | Logston et al. | 370/17 |
| 5,506,954 | 4/1996 | Arshi et al. | 370/62 |
| 5,533,021 | 7/1996 | Branstad et al. | 379/96 |
| 5,689,553 | 11/1997 | Ahuja et al. | 379/202 |

OTHER PUBLICATIONS

Chapter 2 JPEG Overview of C–Cube Microsystems, pp. 9–16.
MPEG–2 Digital Video Technology & Testing, Hewlett–Packard Company 1995 BSTS Solution Note5963–7511E, pp. 1–16.
"Transporting videos across ATMs" by Reinnger et al., Electronic Engineering Times, pp. 56 and 68.

Primary Examiner—Stella Woo
Attorney, Agent, or Firm—David P. Gordon; David S. Jacobson; Thomas A. Gallagher

[57] ABSTRACT

Multimedia conferencing systems are provided and include a plurality of audio/video terminals which are coupled together via a telecommunications network, with the network including switches and an audio bridge. The audio/video terminals are provided with interface modules which receive local audio and video signals, process the signals, and provide separate streams of properly formatted audio data and video data to the network. The video data is switched in the preferably ATM network (i.e., routed) to its desired destination, while the audio data is first routed to the audio bridge for mixing, and then to the desired destination. At the desired destination, the separate audio and video signals are processed and synchronized by the interface module of the destination and provided to the audio/video terminal. Various different synchronization methods for the audio and video data streams are disclosed. In a simple synchronization method, a fixed delay of, e.g., 65 milliseconds is added to the audio stream. In other synchronization methods, time stamps are utilized to determine the video, or video and audio coding delays, and the video or video/audio delta coding delay is used to delay the audio stream. A preferred aspect of the invention involves mapping the audio and video data streams into ATM cells, and utilizing the ATM network for switching or multicasting the video data stream.

20 Claims, 11 Drawing Sheets

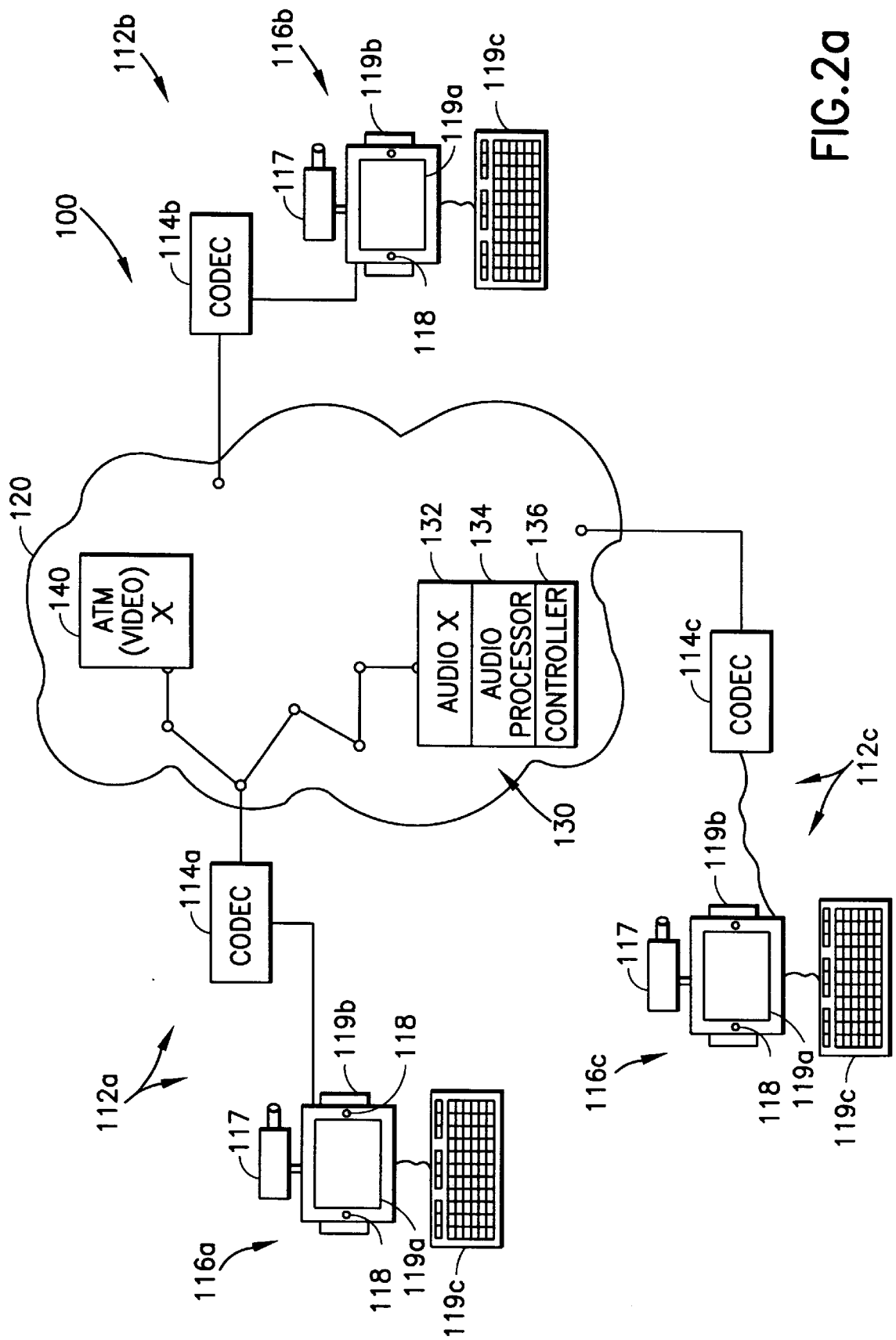

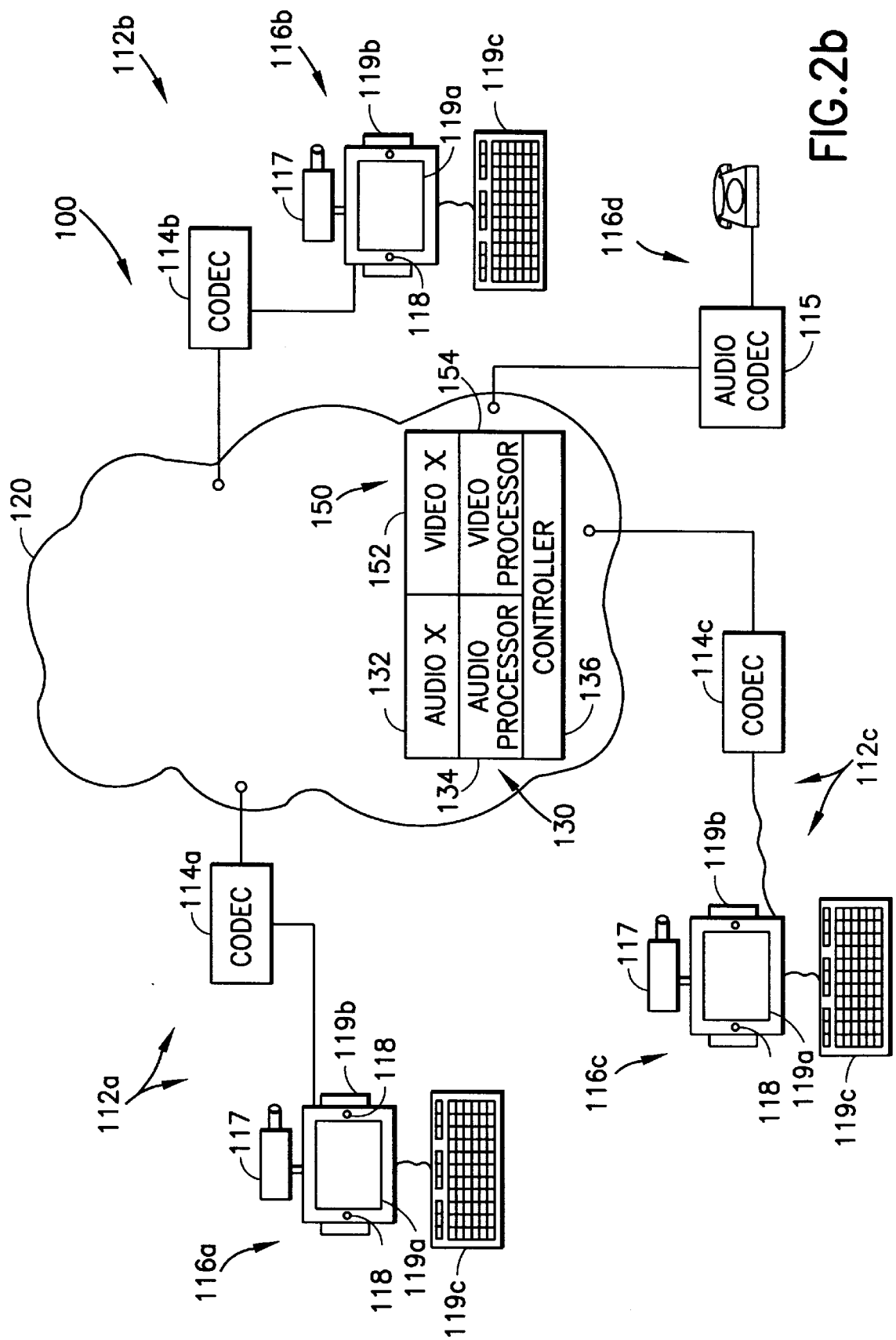

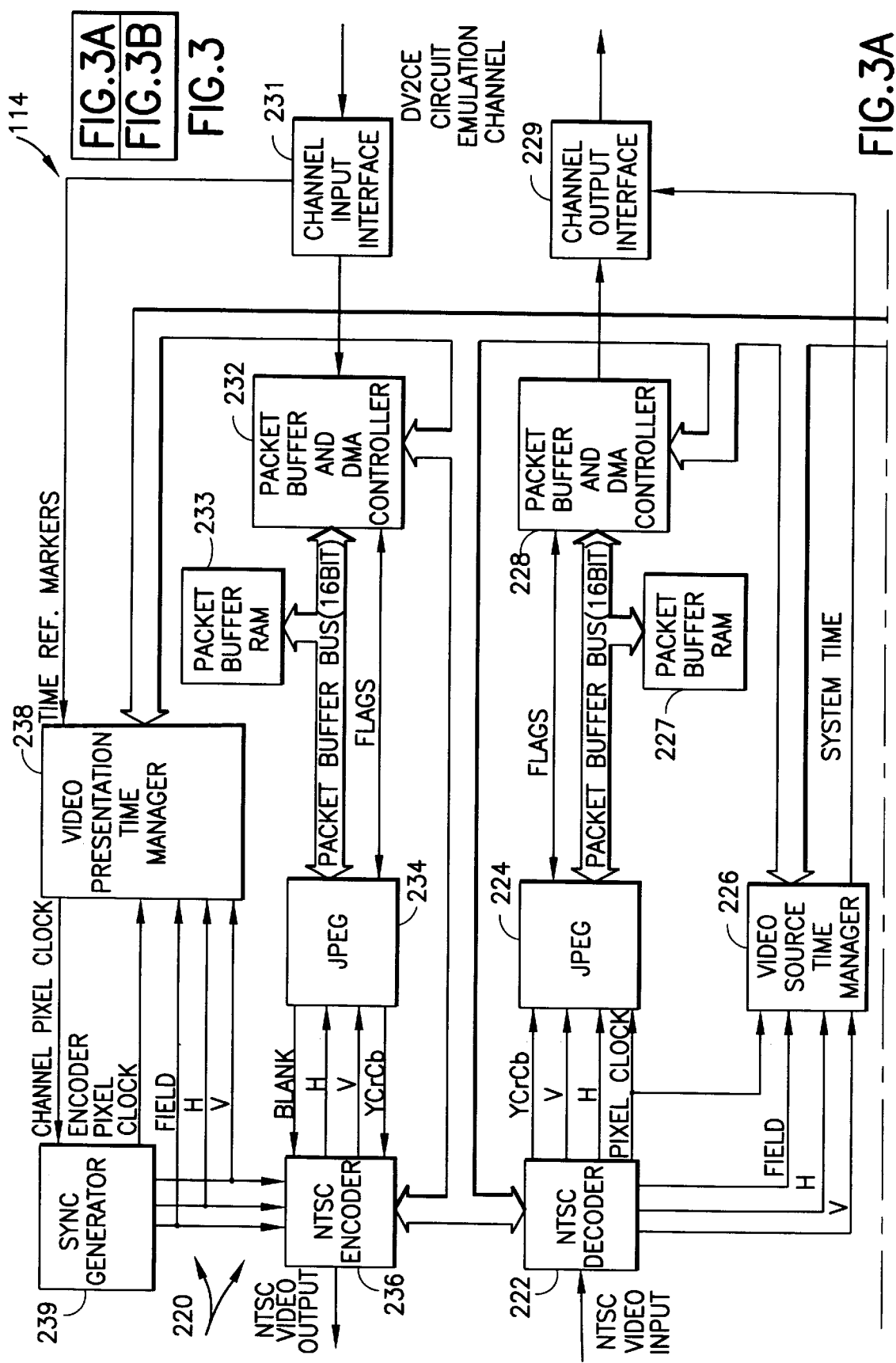

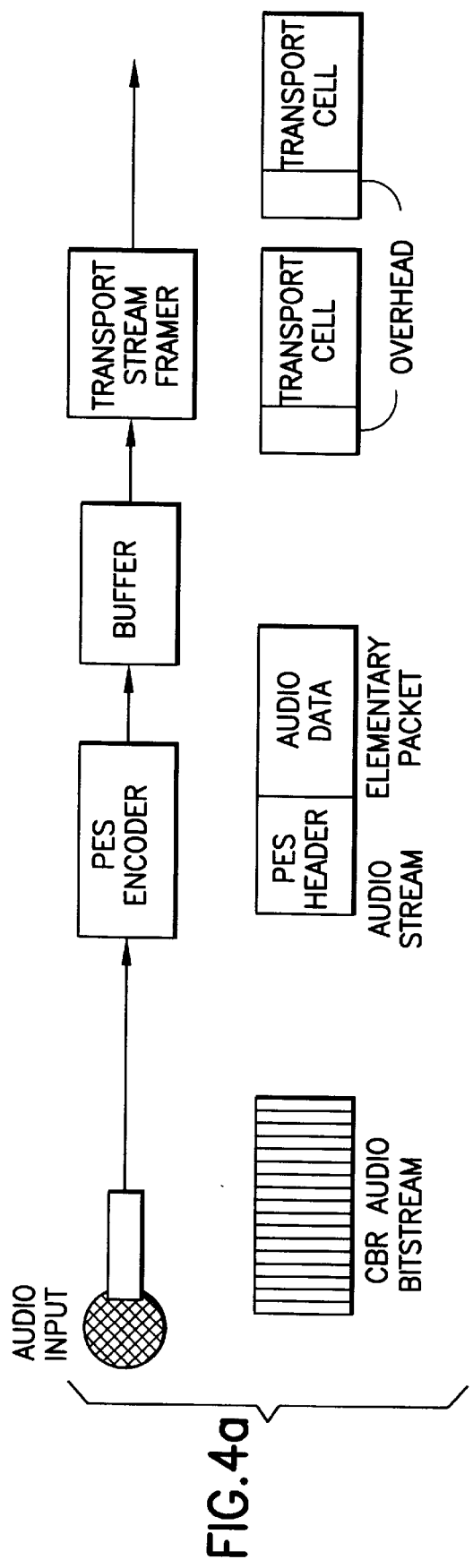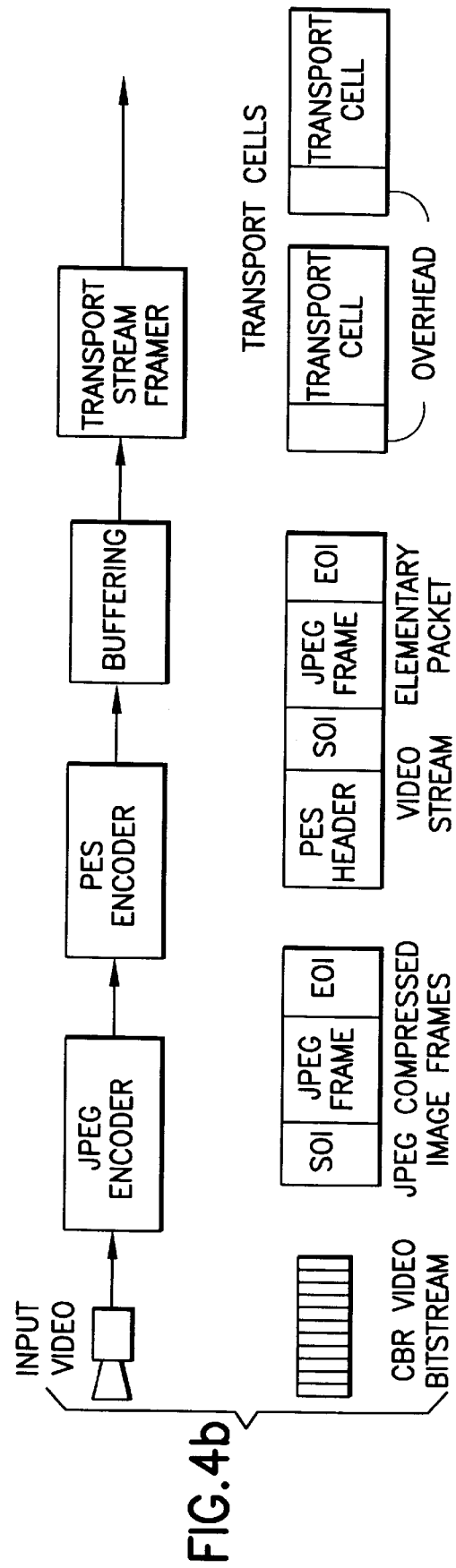

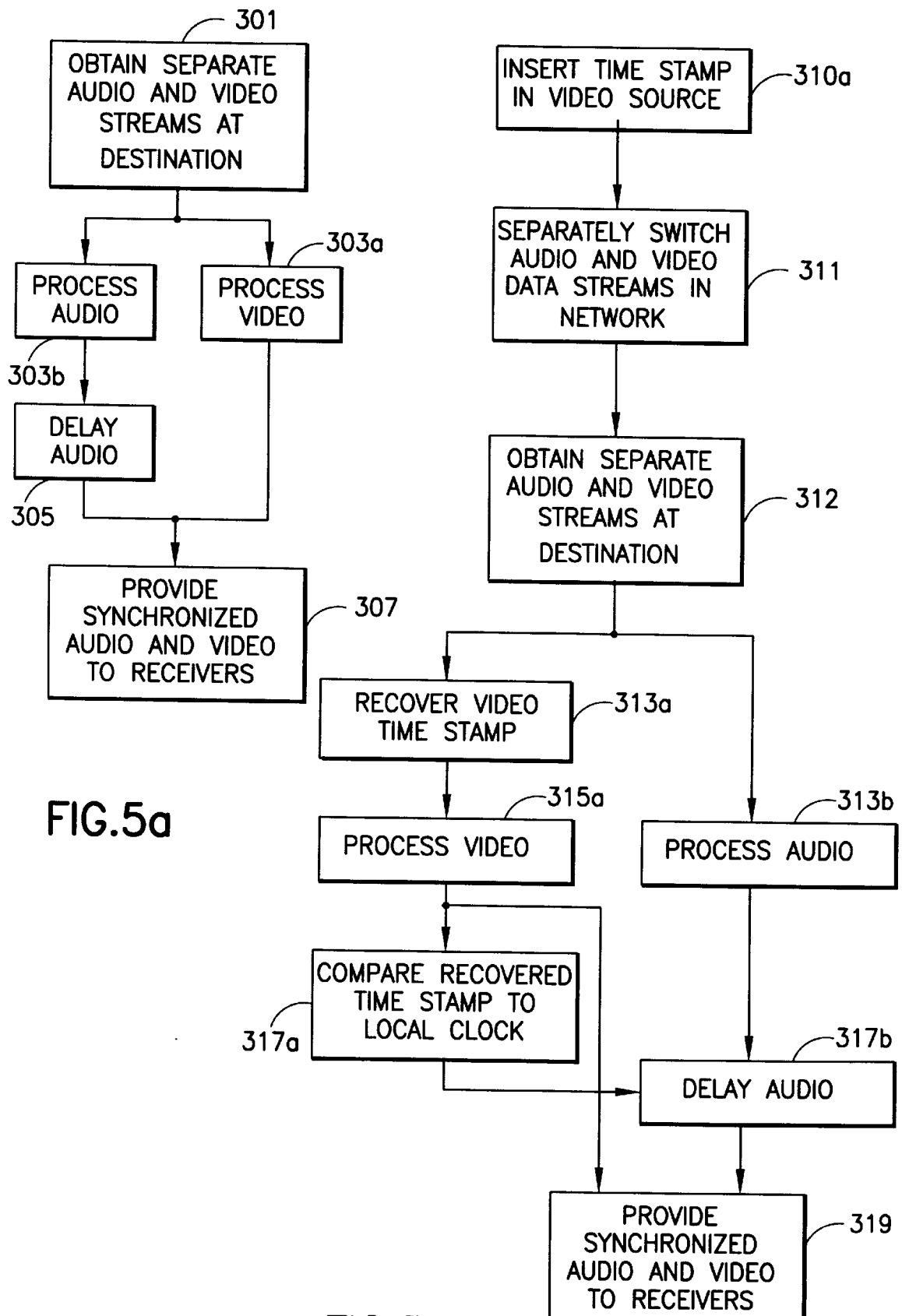

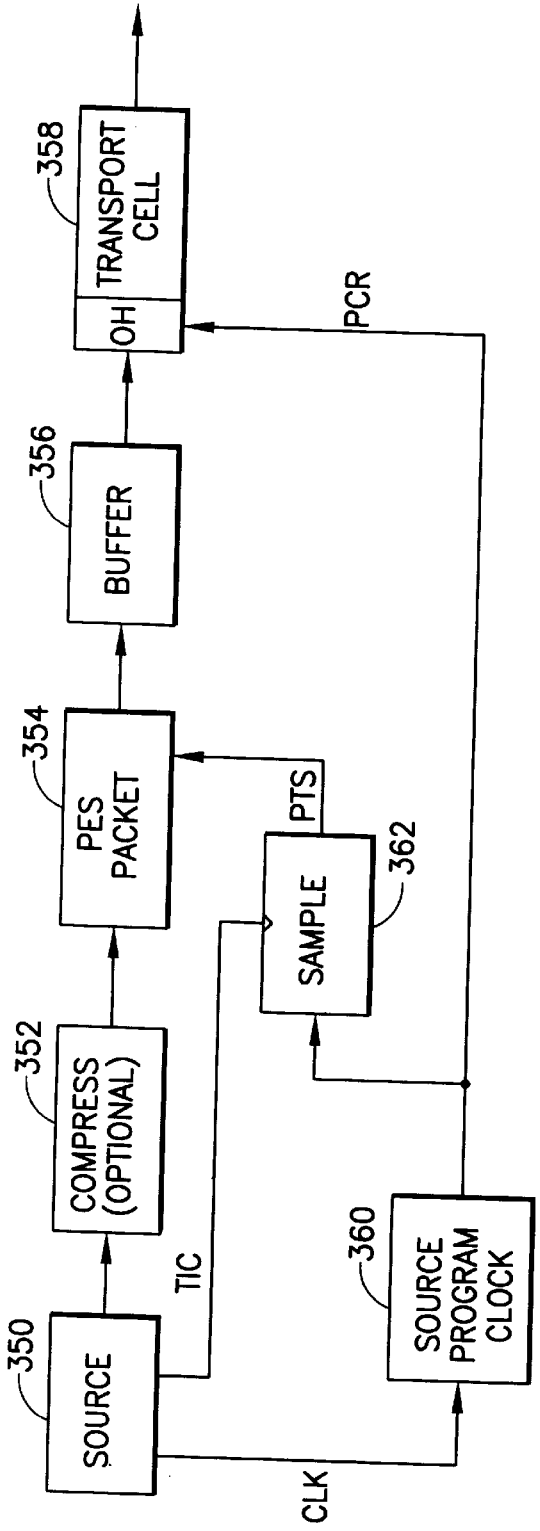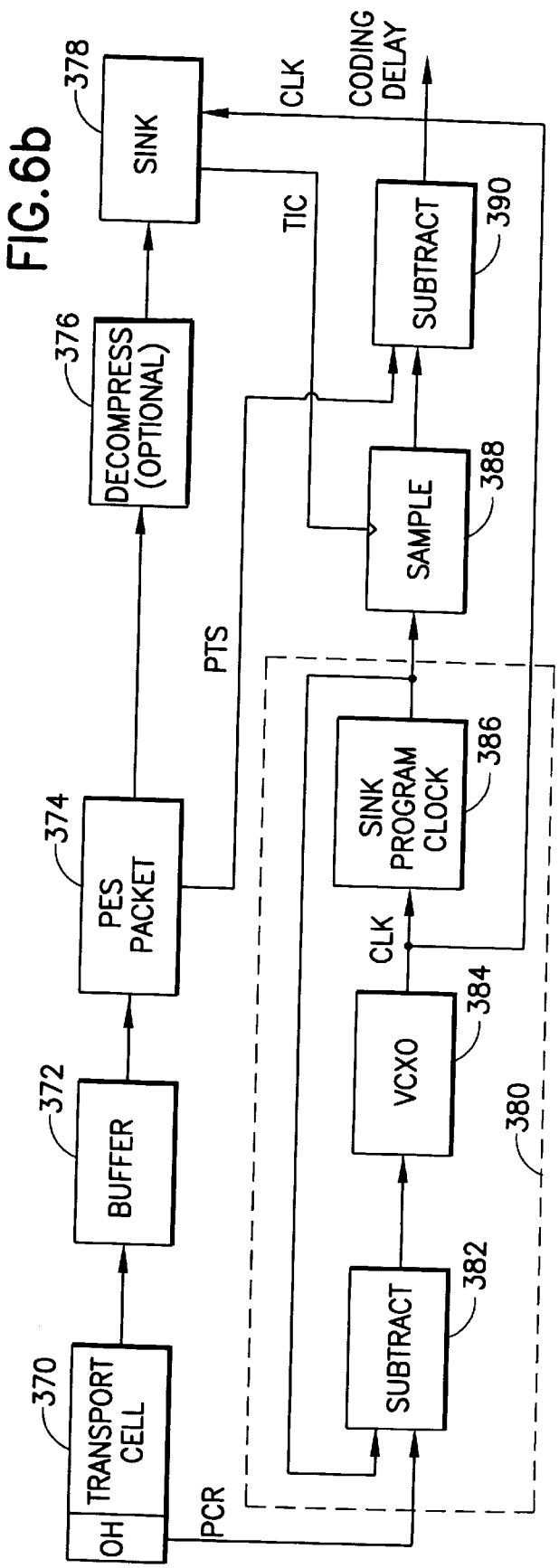

METHODS, APPARATUS, AND SYSTEMS FOR TRANSPORTING MULTIMEDIA CONFERENCE DATA STREAMS THROUGH A TRANSPORT NETWORK

BACKGROUND OF THE INVENTION

1. Field of the Invention

The present invention relates broadly to telecommunications multimedia conferencing. More particularly, the present invention relates to methods, apparatus, and systems for the handling of video, audio, and other data generated by a multimedia conference. For purposes herein, the term "multimedia conferencing" should be understood to include all multimedia multipoint communications, including standard conferencing, as well as distance learning, tele-training, etc.

2. State of the Art

With the advent of the optical network the telecommunications bandwidth available to business and individuals has increased dramatically. One concept utilizing the increased bandwidth is video communication (more commonly now called "multimedia" communications) which permits video, audio, and in some cases other data to be transported from one party to another or others. Multimedia communications can be utilized for a number of applications, and in different configurations. One configuration of recent interest has been multimedia conferencing, where several parties can communicate in a conference style.

In multimedia conferencing, the video data is handled such that each party can see at least one of the other parties, while the audio data is handled such that each party can hear one, several, or all of the other parties. In fact, various telecommunications standards are presently being adopted by the ITU-T and ISO which govern the protocols of multimedia conferencing (see, e.g., ITU-T.120). As part of the multimedia conferencing, various standards have been adopted for the compression of the video and audio data. For example, among the video (digital image) compression standards are the JPEG (Joint Photographic Experts Group) standards promulgated by the joint ISO/CCITT technical committee ISO/IEC JTC1/SC2/WG10, and the MPEG (Motion Picture Experts Group) standards promulgated by ISO under ISO/IEC 11172(MPEG-1) and ISO/IEC 13818 (MPEG-2). Among the audio compression standards are the MPEG audio compression. In addition, other compression techniques such as ADPCM (adaptive differential pulse code modulation) are known.

In the multimedia conferencing systems of the art (as represented by FIG. 1), the audio, video, and other data streams generated by a user's system 12a are multiplexed together directly (as suggested by the H.320 recommendation) in the encoder section of a multimedia encoder/decoder (codec) 14 located at the source/terminal 16, and transported together as an indivisible stream through the transport network 20 (now proposed in ATM format) to a similar "peer" codec 24 at a remote location. The peer codec is either at the remote user site for a point-to-point conference, and/or at a multimedia bridge 26 for a multipoint conference. The multimedia bridge 26, which typically includes a codec/switch 24 and a controller 28, provides conference control (e.g., it determines the signal to be sent to each participant), audio mixing (bridging) and multicasting, audio level detection for conference control, video switching, video mixing (e.g., a quad split, or "continuous presence device" which combines multiple images for display together) when available and/or desirable, and video multicasting. The audio and video data exiting the multimedia bridge is multiplexed, and continues through the transport network 20 to the desired multimedia source terminals 12b, 12c.

While the multimedia conference systems of the art are generally suitable for multimedia conferencing purposes, various components of the system are extremely expensive. In particular, the multimedia bridge 26 which must support the switching, multicasting, and processing of the audio and video data at high speeds is an extremely complex, and hence expensive piece of equipment. In addition, because the prior art requires that all of the audio, video, and other data are routed together to the multimedia bridge in all multimedia conferencing applications, large bandwidths are utilized for a single conference. Indeed, the entire audio/video/data bandwidth must be provided over the entire route from each source/terminal of the conference, through the various nodes of the telecommunications network to the node with the multimedia bridge. Even if a party should desire to have only an audio connection to multimedia conferences, thereby eliminating the costs of video processing, such a party would need to have a line (channel) with sufficient bandwidth to receive the multiplexed audio/video/data stream. Such high bandwidth lines, however, are still relatively expensive.

SUMMARY OF THE INVENTION

It is therefore an object of the present invention to provide a multimedia conferencing system which reduces the processing required by the multimedia bridge.

It is another object of the invention to utilize the switching and multicasting capabilities of the ATM network so as to limit the amount of switching and multicasting required by the multimedia bridge of the multimedia conferencing system.

It is a further object of the invention to separately route and handle the audio and video components of a multimedia conference.

It is an additional object of the invention to provide synchronization mechanisms for the recombination of separately handled audio and video components of a multimedia conference.

Another object of the invention is to provide methods, apparatus, and systems for multimedia conferencing, where the audio data and video data generated in a conference are transported separately and recombined at each terminal.

In accord with the objects of the invention, a multimedia conferencing system comprises a plurality of audio/video terminals which are coupled together via a telecommunications network, with the network including switches and an audio bridge. The audio/video terminals are provided with interface modules which receive local audio and video signals, process the signals, and provide separate streams of properly formatted audio data and video data to the network. The video data is switched in the network (i.e., routed) to its desired destination, while the audio data is first routed to the audio bridge for mixing, and then to the desired destination. At the desired destination, the separate audio and video signals are processed and synchronized by the interface module of the destination and provided to the audio/video terminal.

According to one aspect of the invention, various different synchronization mechanisms for the audio and video data streams can be utilized, ranging from mechanisms which are simple to implement, to mechanisms which require significant information about the network. For example, a simple synchronization mechanism assumes that the delay in the network (i.e., transmission times) for the audio and video are substantially identical, and that the video (de)coding delay is greater than the audio (de)coding delay by a substantially known amount (e.g., 50–80 milliseconds). In this situation, synchronization is obtained by delaying the audio by the substantially known amount (e.g., 65 milliseconds). Because human perception of an out-of-synch condition is limited to the audio and video being out of synch by at least ±25 milliseconds, in many situations, the simple synchronization mechanism is sufficient.

Rather than applying a predetermined delay, clock information (e.g., a time stamp) can be provided in the video data stream in accord with a second synchronization technique. By comparing the incoming clock information to local clock information, the video coding delay can be determined, and applied to the audio data stream (which is assumed to be minimal). Alternatively, if the audio coding delay is known, the difference between the determined video delay and the known audio delay can be applied to the audio signal.

A third, and more complex mechanism for synchronization involves inserting a clock sample (time stamp) in the digitized audio and video streams. At the audio bridge, the time stamp which relates to the video which is to be received at a particular terminal is utilized in conjunction with the mixed audio stream. Then, at the receiving end, the received video and audio stream time stamps are extracted and compared to local clocks, and a delay representing the differential of the comparisons is calculated and applied (preferably to the audio path).

Yet another mechanism for synchronization involves utilizing the capabilities of an external controller which supervises the path over which the audio and video streams are directed. By tracking delays through switches, and bridges, and by determining the video and audio coding delays, the external controller can provide the interface module receiving the audio and video streams with a "delta" delay which can be applied to the "faster" of the two data streams (typically the audio).

A preferred aspect of the invention involves mapping the audio and video data streams into ATM cells, and utilizing the ATM network for switching or multicasting the video data stream. The bridge for mixing and switching the audio data stream may be located at any node of the ATM network, and may also include a video bridge for accommodating a "continuing presence device" and other video processing. However, in accord with the invention, even where a video bridge is provided, the audio and video data streams are not multiplexed.

Additional objects and advantages of the invention will become apparent to those skilled in the art upon reference to the detailed description taken in conjunction with the provided figures.

BRIEF DESCRIPTION OF THE DRAWINGS

FIG. 2a is a high level diagram of a first multimedia conferencing system with audio and video data flows according to the invention.

FIG. 2b is a high level diagram of a second multimedia conferencing system with audio and video data flows according to the invention.

FIG. 4a is a flow chart representing the encoding of the audio data by the network to terminal interface of FIG. 3.

FIG. 4b is a flow chart representing the encoding of the video data by the network to terminal interface of FIG. 3.

FIGS. 5a–5d are flow charts of first, second, third, and fourth audio/video synchronization techniques according to the invention.

FIGS. 6a and 6b are block diagrams of the source and sink time manager functions utilized in the synchronization techniques of FIGS. 5a–5d.

DETAILED DESCRIPTION OF THE PREFERRED EMBODIMENTS

Figure 1:
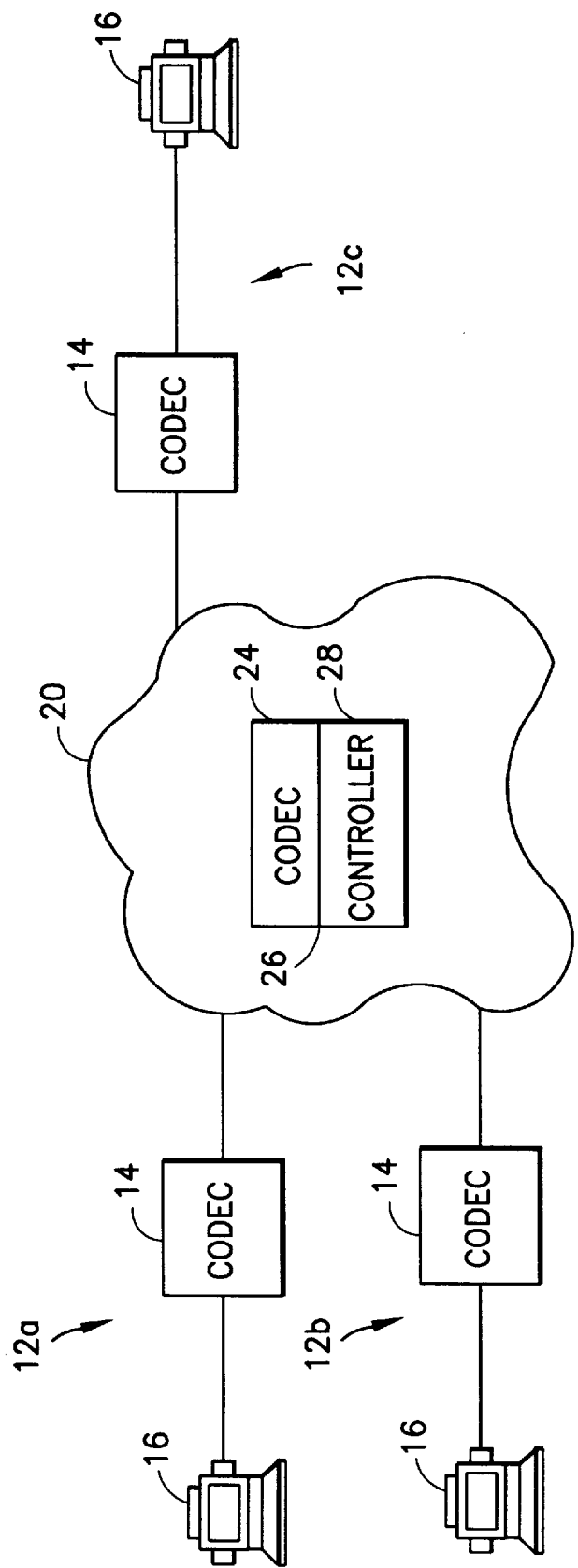
FIG. 1 is a high level diagram of a prior art multimedia conferencing system having a plurality of multimedia conferencing sites coupled by an ATM telecommunications network, with the diagram showing the audio/video data flow therein.

Turning now to FIG. 2a, a first system 100 according to the invention is seen with the flow of audio and video data therein. In system 100, a plurality of users 112a, 112b, 112c, are each provided with codecs 114a, 114b, 114c, and multimedia source/terminals 116a, 116b, 116c. The codecs 114, which are described in greater detail with reference to FIGS. 3, 4a, and 4b, act as an interface between the network 120, and the source/terminals 116. The source/terminals typically include cameras 117, microphones 118, and computer terminals 119. The computer terminals 119, in turn, typically include a video monitor 119a, speakers 119b, keyboards 119c, etc. as is known in the art.

In accordance with the invention, video information which is to be transmitted, is obtained by the camera or other video source 117 of a user 112, provided to the respective codec 114 of that user for processing, and then sent via the network 120 to its destination. The audio information, on the other hand, is obtained by the microphone 118 (or other means), provided to the codec 114 for processing, and then separately sent via the network 120 to its destination. As indicated in FIG. 2a, the audio information may be sent to an audio bridge 130 located at a first node of the network 120, while the video information may be sent to an ATM routing switch 140 located at another node of the ATM network 120. The audio bridge 130 generally includes a switch 132 and an audio processing block 134. In the audio processing block 134, the audio information may be decoded by a codec and mixed under control of a controller 136 with the audio information of other users of the multimedia conference. Typically, the audio mixing involves summing, or weighting and summing the audio of all of the audio signals of the users in the conference, and then subtracting the source audio signal of the destination. The so-obtained mixed audio information may then be coded by the codec and forwarded to its destination. The video information, on the other hand, is typically simply routed, or multicast and routed to its destination(s).

At each destination, the video information being received is provided to the user's codec 114 for processing, and then provided to the video monitor 119a. The separately received mixed audio information, is likewise sent to the codec 114 for processing, and then provided to the speaker 119b. In accord with a preferred aspect of the invention, at the codec 114, the audio information is synchronized with the video information according to any desired synchronization technique, prior to being provided to the speaker 119b.

Turning now to FIG. 2b (where like numerals indicate like elements), there may be circumstances where it is desirable to provide a video bridge 150 (e.g., for providing a "continuous presence device") in conjunction with the audio bridge 130. In these circumstances, the video bridge 150 may be located at the same location as the audio bridge 130, and will typically include a video switch 152 and video controller circuitry 154 (additional details being described below with reference to FIG. 7). However, even where a video bridge 150 is provided at the same location as the audio bridge 130, there are still advantages to separately transporting the audio and video data, as opposed to multiplexing them together. In particular, and as seen in FIG. 2b, an audio source/terminal 116d is provided without video capability. The audio source/terminal 116d is coupled via an audio codec 115 to the ATM network 120 via a relatively low bandwidth line (e.g., a T1, or a regular copper telephone line which is coupled to a network analog-to-ATM codec). By handling the audio information separately from the video information, it is possible to include the audio source/terminal 116d in the conference without requiring that the audio source be coupled to a high bandwidth line (e.g., a DS-3), and without requiring the audio terminal demultiplex the audio and video data and discard the video data. Thus, audio information provided by the source/terminal 116d is provided to the audio bridge 130 where it is mixed with the other audio signals which are intended for receipt by audio source/terminal 116d; and an appropriate mixed audio signal is sent from the audio bridge 130 to the audio source/terminal 116 without extraneous video information being multiplexed into the audio data stream.

Figure 3B:
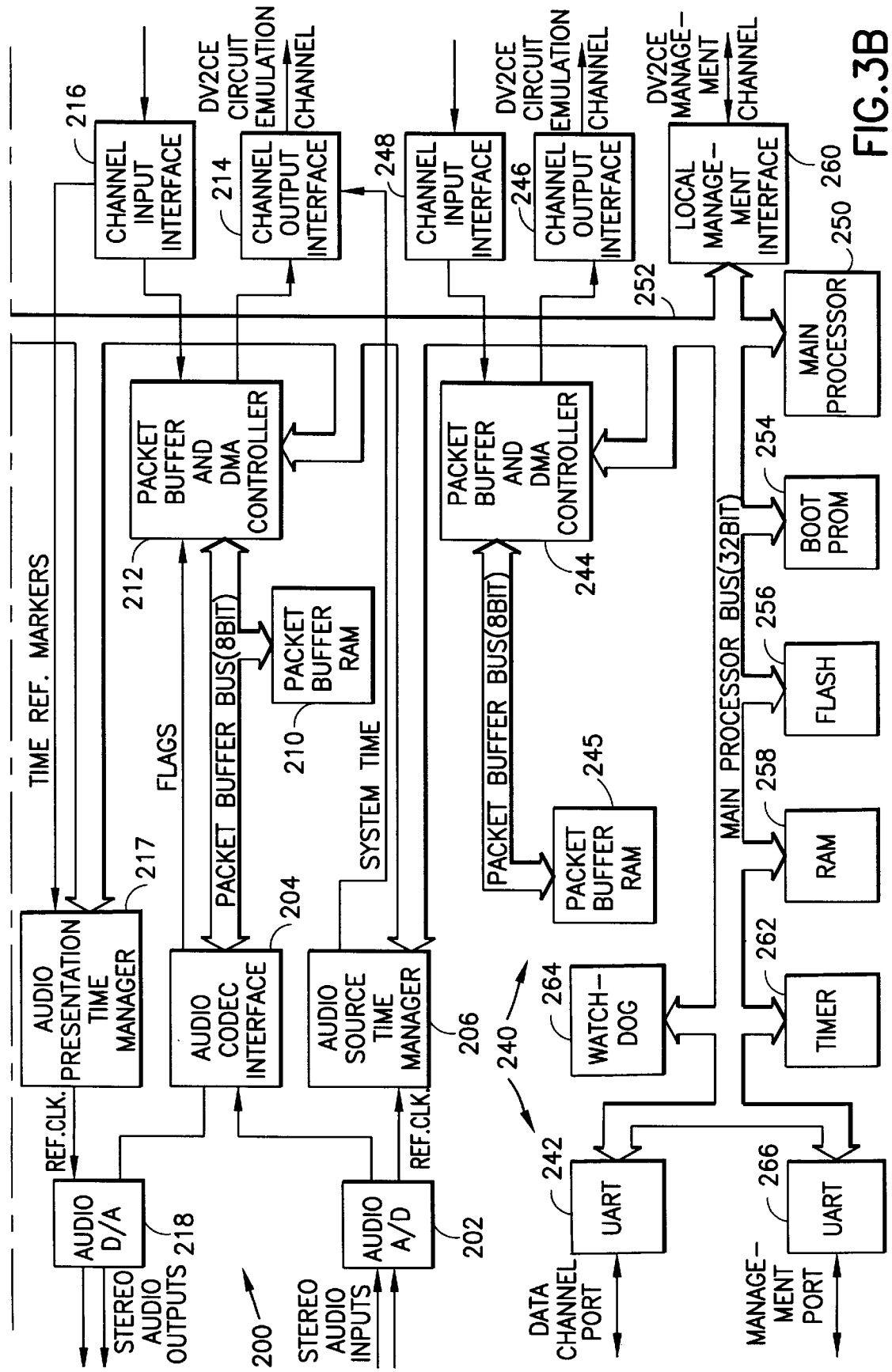
FIG. 3 is a block diagram of a preferred network to terminal interface in accord with the invention.

A high level block diagram of the codec 114 which interfaces the source/terminals 116 to the network 120 is seen in FIG. 3. The codec 114 generally includes audio circuitry 200, video circuitry 220, modem type data circuitry 240, and a main processor or host 250 with an associated bus 252 and associated circuitry such as a boot PROM 254, flash memory 256, SRAM 258, a local manager interface 260, a timer 262, a watchdog circuit 264, and a management port UART 266. The boot PROM 254 stores the code which boots the main processor 250. The flash memory 256 is typically utilized to hold the main code and static configuration information. The RAM 258 is typically a dynamic RAM for running the code and temporarily storing data. The timer 262 provides clock signals for the operating system, while the watchdog 264 performs reset functions. The management port UART 266 is provided for access by a system manager (not shown) to the codec, while the local management interface 260 provides the codec with the capability of interfacing with a local management device (not shown).

The audio circuitry 200 includes an analog to digital converter 202, an audio codec interface 204, an audio source time manager 206, an audio packet buffer SRAM 210, a packet buffer and DMA controller 212, an audio channel output interface 214, an audio channel input interface 216, an audio presentation time manager 217, and a digital to analog converter 218. The video circuitry 220 includes a composite NTSC/PAL video decoder 222, a JPEG compressor 224, a video source time manager 226, an outgoing packet buffer SRAM 227, an outgoing video packet buffer and DMA controller 228, a video channel output interface 229, and a video channel input interface 231, an incoming packet buffer and DMA controller 232, an incoming packet buffer SRAM 233, a JPEG decompressor 234, a composite NTSC/PAL video encoder 236, a video presentation time manager 238, and a video sync generator 239. The data circuitry 240, includes a data channel port UART 242, a data packet buffer and DMA controller 244 with an associated data packet buffer RAM 245, a data channel output interface 246, and a data channel input interface 248.

With reference now to FIGS. 3 and 4a, generally, outgoing audio information received from a microphone(s) or other audio source is applied to the analog to digital converter 202 which simultaneously provides the digital audio data to the audio codec interface 204 and, in accord with a preferred aspect of the invention, provides a reference clock to the audio source time manager 206. The audio codec interface 204 converts the format of the data received from the A/D converter so that the data may be properly provided to the packet buffer SRAM 210 under control of the packet buffer and DMA (direct memory access) controller. In addition, in accord with the preferred embodiment, the main processor 250 provides a PES (Program Elementary Stream) header to the SRAM 210 to effectively generate PES formatted packet. The packet buffer and DMA controller 212 controls the movement of the packetized audio data from the SRAM 210 to the channel output interface 214 as required. The channel output interface 214, in turn, places the data in a desired format (e.g., a Transport Stream (TS) format, or an ATM format) by inserting a system time indicator (provided by the audio source time manager) into the signal, and provides the desired overhead bits or bytes (including OAM where appropriate). The channel output interface 214 implements a serial channel physical interface by receiving the parallel stream of data from the buffer controller, and converting the parallel stream into a serial stream with an accompanying clock, etc.

Incoming audio information is received by the audio channel input interface 216 which frames on the incoming (TS) cell, checks the headers for errors, passes the payload in byte wide format (parallel format) to the packet buffer and DMA controller 212, and passes a time reference marker (Program Clock Reference value - PCR) to the audio presentation time manager 217. The DMA controller 212 places the payload in desired locations in the SRAM 210. When the data is to be presented to the receiver as audio information, the DMA controller takes the data out of the SRAM 210 and provides it to the audio codec interface 204, which reformats the data into a serial stream for digital to analog conversion by the D/A converter 218. The presentation time manager 217 is provided to recover a local clock. As will be discussed hereinafter with reference to FIGS. 5a–5d, the main processor 250 controls the delay of the audio information by indicating to the DMA controller 212 how much time delay to introduce in the SRAM buffers 210, in order to synchronize the audio signal with the video signal.

The video circuitry 220 processes and outputs the video signals separately from the audio circuitry 200. As seen in FIGS. 3 and 4b, outgoing video information is received by the video circuitry 220 as a composite analog input. The composite input is decoded by the composite decoder 222 which provides digital luminance and color difference signals to the video compressor 224, and horizontal and vertical synch and a field indicator to the video source time manager 226. Although other compression techniques such as MPEG can be utilized, the video compressor 224 as shown is a JPEG compressor which compresses the data, and generates a JPEG frame with start of image and end of image markers (see FIG. 4b). The video compressor 224 puts the framed compressed data in parallel format, so that the buffer controller 228 can place the compressed data into the packet buffer SRAM 227. In accord with the preferred embodiment, the host (main processor 250) provides PES headers via the buffer controller 228 to desired locations in the SRAM 227 to effectively convert the JPEG frame into a PES packet (see FIG. 4b). The packet buffer and DMA controller 228 provides the channel output interface 229 with the PES packet data at a constant rate. If sufficient data is not available in the packet buffer SRAM 227, the channel output interface 229 generates an "idle cell". Regardless, the channel output interface 229, places the data in a desired format (e.g., TS or ATM format) by inserting a system time indicator (provided by the video source time manager 226) into the signal, and provides the desired overhead bits or bytes (including OAM where appropriate). The channel output interface 229 implements a serial channel physical interface by receiving the parallel stream of data from the buffer controller 228, and converting the parallel stream into a serial stream with an accompanying clock, etc.

In the receiving direction, video data is obtained at the video channel input interface 231 which frames on the incoming (TS) cell, checks the headers for errors, passes the payload in byte wide format (parallel format) to the packet buffer and DMA controller 232, and passes a time reference marker to the video presentation time manager 238. The DMA controller 232 places the payload in desired locations in the SRAM 233. When the JPEG decompressor 234 indicates that the next video field is required for display, the DMA controller 232 provides the buffered compressed video from the head of the buffer to the JPEG decompressor 234. The JPEG decompressor 234, in turn, decompresses the data, and provides digital luminance and color difference signals to the composite video encoder 236.

The composite video encoder 236 operates based on the video timing signals (horizontal line timing or H, vertical field timing or V, and the field indicator) generated by the sync generator, based on the sample clock recovered by the presentation time manager from the channel PCR. The composite video encoder 236 in turn indicates to the JPEG decompressor when it requires video data for the next video field, and which field is required. Based on these timing signals and the decompressed video data, the composite video encoder generates the analog video output for the video monitor 119a.

The presentation time manager serves to recover the video sample clock and local (sink) Program Clock (PC) from the video channel PCR, and also to make available to the host processor the sampled values of the PC for comparison to the received Presentation Time Stamp (PTS) in the PES headers.

It should be appreciated by those skilled in the art, that the main processor 250 can determine when data which is being placed in the packet buffer RAM 233 is going to be output to a video monitor. This information is useful in synchronizing the audio and video signals as discussed in detail below.

It should also be appreciated that in the preferred embodiment of the invention, the video circuitry 220 utilizes two packet buffer SRAMs 227, 233, and two packet buffer and DMA controllers 228, 232, as compared to a single packet buffer SRAM 210 and packet buffer and DMA controller 212 for the audio. The two SRAMs and controllers for the video are provided because the amount of video data is large as compared to the audio data. The audio data does not require use of two SRAMs and controllers because it is able to share a common resource for both directions of signal flow.

Because the amount of video data is large, the invention advantageously requires that the video and audio data streams be separately handled (i.e., that they not be multiplexed). Thus, any terminal such as terminal 116d (see FIG. 1) which is audio only, need only include the audio portion (and typically, as described below, the data portion) of the circuitry of FIG. 3. Moreover, because the bandwidth of the channel interface of the audio portion of the circuit is small relative to the video portion of the circuitry, audio-only terminals can utilize relatively less expensive low bandwidth lines.

Returning to FIG. 3, it can be seen that the codec 114 also codes and decodes non-video and non-audio serial data. In accord with the preferred embodiment of the invention, the serial data is received by a conventional Universal Asynchronous Receiver/Transmitter (UART) 242 and is provided to the main processor 250. The main processor preferably runs a Serial Line Internet Protocol (SLIP), which brings the serial data to an Internet Protocol (IP) stack in the host. The IP protocol data is packetized and may be sent to the data packet buffer SRAM 245 via the packet buffer and DMA controller 244, or alternatively sent to the audio packet buffer SRAM 210 via the audio DMA controller 212. Where the packetized data is sent to the separate SRAM 245, a separate DMA controller 244 provides the packetized data to a separate channel output interface 246. Where the IP protocol data is packetized and sent to the audio packet buffer SRAM 210, the audio data and serial data are effectively time division multiplexed according to a desired frame, and the audio data and serial data are output together in a time division multiplexed manner over the channel output interface 214.

The handling of incoming serial data depends on whether the serial data is multiplexed with the audio data, or separately provided. In the embodiment of FIG. 3, where the serial data is received separately, the channel input interface 248 receives the data, frames on the incoming cell, checks the headers for errors, and passes the payload in byte wide format (parallel format) to the packet buffer and DMA controller 244 which forwards it to the SRAM 245. The main processor 250 then obtains the IP packet data, decodes it, and provides the data to the UART 242 for local use.

Because the audio and video data streams are handled and transported separately, it is necessary at the receiving end to synchronize the two. Four different synchronization techniques are seen in the flow charts of FIGS. 5a–5d.

The most simple synchronization mechanism assumes that the delay in the network (i.e., transmission times) for the audio and video are substantially identical, and that the video (de)coding delay is greater than the audio (de)coding delay by a substantially known amount (e.g., 50–80 milliseconds). In this situation, synchronization is obtained by delaying the audio by the substantially known amount (e.g., 65 milliseconds). In particular, as seen in FIG. 5a, at step 301, the audio information and video information are separately and asynchronously obtained. The video information is decompressed and otherwise processed at 303a, while the audio information is separately processed at 303b. At 305, the audio information is delayed by a predetermined length of time (e.g., 65 milliseconds) which is substantially equal to delay introduced in the video stream by the decompression processing. At 307, the video information and the delayed audio information which is now substantially synchronized with the video information are provided to the audio/video system of the receiver. Because human perception of an out-of-synch condition is limited to the audio and video being out of synch by at least ±25 milliseconds, in many situations, the simple synchronization mechanism of FIG. 5a is sufficient.

In accord with a second synchronization mechanism, and as discussed above with reference to FIG. 3, clock information (e.g., a time stamp) can be provided in the video data stream. By comparing the incoming clock information to local clock information, the video coding delay can be determined, and applied to the audio data stream. Alternatively, if the audio coding delay is known, the difference between the determined video delay and the known audio delay can be applied to the audio signal. In particular, and with reference to FIG. 5b, at 310a, a presentation time stamp is inserted into the video information at the source. At 311, the video information with the time stamp is switched and otherwise transported through the network and the audio information is separately switched, bridged, and otherwise transported through the network. At 312, the video information containing a time stamp, and the audio information are separately and asynchronously obtained at the destination. At 313a, the time stamp for the video information is recovered, and at 315a, the video information is decompressed and otherwise processed. The audio information is separately processed at 313b. At 317a, the time stamp for the video information is compared against a local clock in order to determine the video coding (i.e., compression, plus buffer delays, plus decompression) delay. The result of that comparison, or a function thereof, is then used to delay the audio signal at 317b. Alternatively, and as indicated at 317c, if the audio coding delay is known, the difference between the video coding delay and the audio coding delay, or a function thereof, may be used to delay the audio signal at 317b. At 319, the video information and the delayed audio information which is now substantially synchronized with the video information are provided to the audio/video system of the receiver.

Figure 5C:
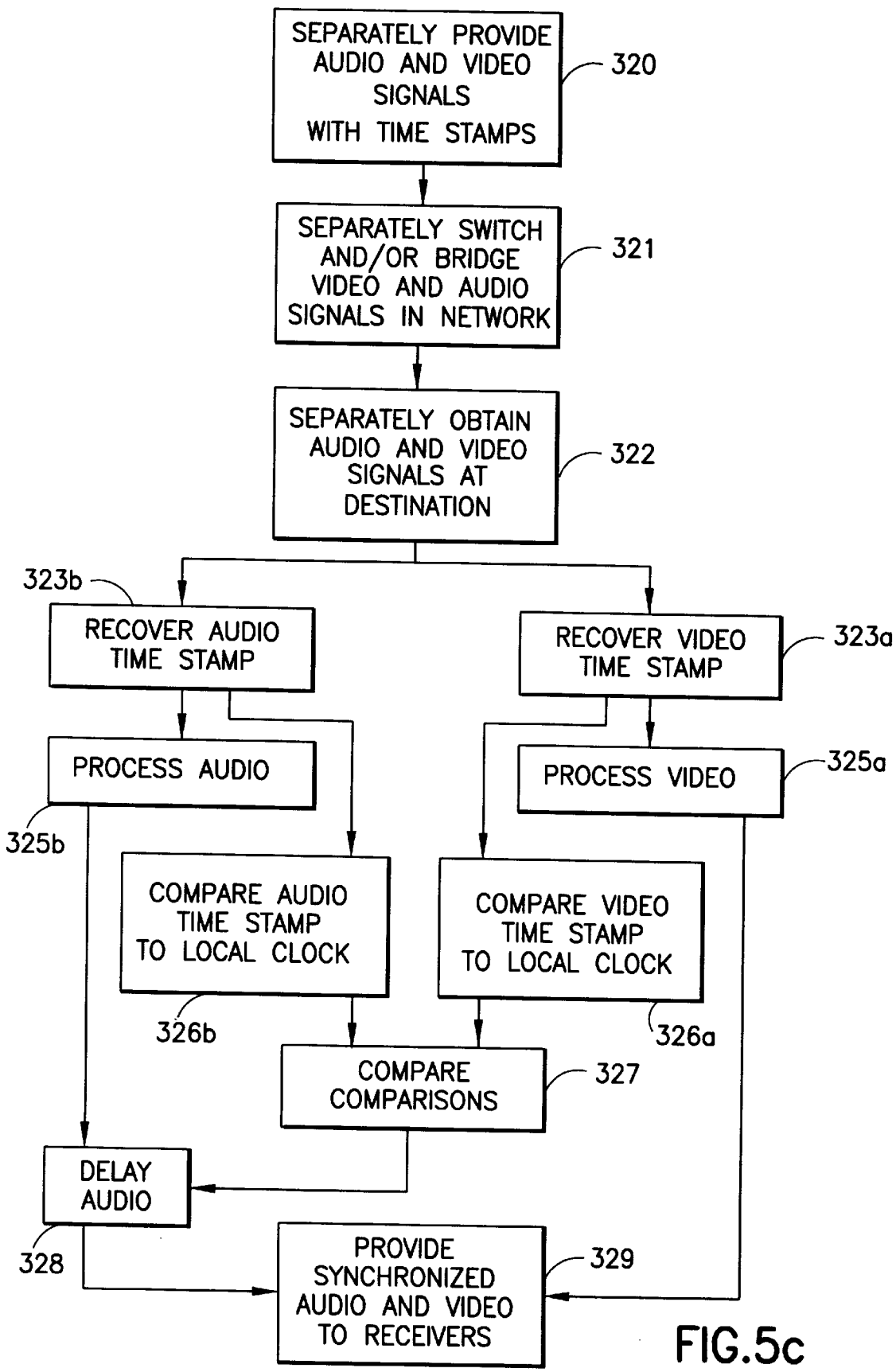
Figure 5D:
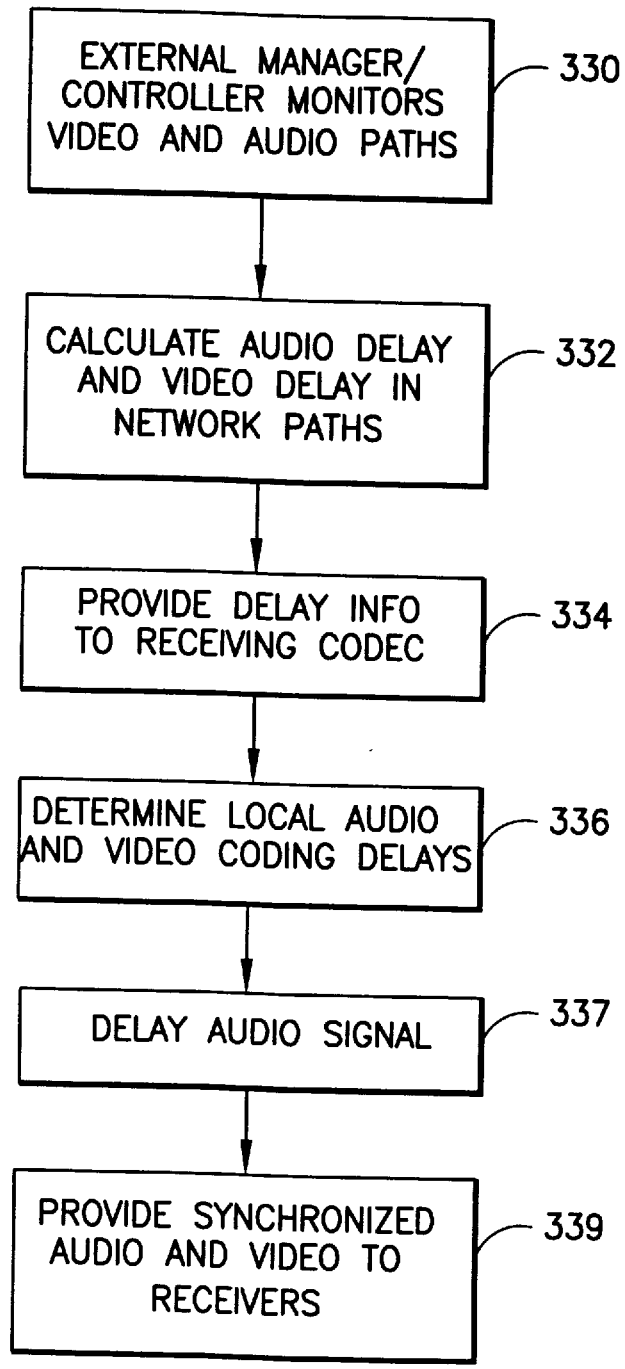

A third, and more complex mechanism for synchronization involves inserting a clock sample (time stamp) in both the digitized audio and video streams. At the audio bridge, the time stamp which relates to the video which is to be received at a particular terminal is utilized in conjunction with the mixed audio stream. Then, at the receiving end, the received video and audio stream time stamps are extracted, compared to local clocks, and the comparisons are compared, and a delay representing the differential delay is calculated and applied (preferably to the audio path). Thus, as seen in FIG. 5c, at 320, source video information is provided with a video presentation time stamp, while source audio information is separately provided with an audio time stamp. At 321, the audio information with its time stamp, and the video information with its time stamp are separately switched, and/or bridged, and otherwise transported through the network. At 322, the video information containing the video time stamp, and the audio information containing the audio time stamp are separately and asynchronously obtained. At 323a, the time stamp for the video information is recovered, while at 323b, the time stamp for the audio information is recovered. At 325a, the video information is decompressed and otherwise processed, while at 325b, the audio information is separately processed. At 326a the audio time stamp is compared to a local clock, while at 326b, the video time stamp is compared to the local clock. The comparisons are then themselves compared at 327 and the result is used to delay the audio signal at 328. At 329, the video information and the delayed audio information which is now substantially synchronized with the video information are provided to the audio/video system of the receiver.

A fourth mechanism for synchronization involves utilizing the capabilities of an external controller which supervises the path over which the audio and video streams are directed. By tracking delays through switches, and bridges, and by determining the video and audio coding delays, the external controller can provide the interface module receiving the audio and video streams with a "delta" delay which can be applied to the "faster" of the two data streams (typically the audio). In particular, and with reference to FIG. 5d, at 330, the external (management) controller obtains information regarding the paths for the video and audio information. At 332, using knowledge of the delay at and between each node, and the delay in each switch or bridge, the external controller calculates the delay for the audio information and the delay for the video information up to the delay in the receiving codec. At 334, the external controller provides the delay information (or the delta) to the codec of the receiving terminal (typically via the management port UART of that codec). Using local information regarding the audio and video coding delays in the codec, the main processor of the codec calculates at 336 the difference between the total audio delay and the total video delay for the audio and video information, and at 337 delays either the audio or video signals (usually the audio) accordingly. At 339, the video information and the delayed audio information which is now substantially synchronized with the video information are provided to the audio/video system of the receiver. It will be appreciated that instead of having the main processor of the codec calculate at 336 the delta delay, the codec could provide the management controller with information regarding its internal audio and video delays, and the management controller could calculate and provide the total delays or delay difference to the codec.

The mechanisms for generating and utilizing time stamps which are used as discussed above with reference to FIGS. 5b and 5c, and which are indicated with respect to the video source time manager 226, video presentation time manager 238, audio source time manager 206 and audio presentation time manager 217 of FIG. 3, are seen in FIGS. 6a, and 6b. A time stamp generation diagram is seen in FIG. 6a which relates closely to FIGS. 4a and 4b, and is shown as being generic for both audio and video time stamp generation. The flow of data seen is FIG. 6a is essentially that seen in FIGS. 3, 4a and 4b. In particular, data from the audio or video source 350 is optionally compressed at 352 (with the video using, for example, JPEG or MPEG compression, and the audio using, for example, MPEG or ADPCM compression), and the data or compressed data is then packetized 354 in the buffer 356 and transported as cells 358. As indicated, in packetizing the data, a "presentation" time stamp (PTS) is added which may be used for audio/video synchronization purposes as described above with reference to FIGS. 5b and 5c. Additionally, as the cells are readied for transport, a program clock reference (PCR) which is also helpful in the audio/video synchronization is provided.

The presentation time stamp PTS is generated by sampling a source program clock at fixed locations in the data stream. In particular, the data generated by the source is generally accompanied by a clock CLK, which is provided to the source program clock 360. The source program clock 360 is preferably embodied as a free running counter. At given fixed locations in the data stream (e.g., the Field 1 indicator for video; or an arbitrary regular time interval for audio), the source generates a control signal or "tic" which causes a latch 362 to sample and latch in the count of the source program clock 360. The count sampled by the latch 362 is taken as the PTS, and is placed into the header of the PES packet. It should be appreciated that the placement of the PTS into the PES packet may actually be accomplished by adding the PTS into predetermined buffer locations; i.e., the packet is formed in the buffer.

Besides utilizing the count of the source program clock 360 in generating the PTS, the count of the source program clock 360 is also used as a program clock reference (PCR). In particular, as a cell or group of cells is being readied for transport, the count of the program clock 360 is taken and inserted as the PCR into the overhead of the transport cell. It should be appreciated that the difference in the PTS and PCR values represents the encoding delay; i.e., the delay introduced by compression and transmit buffering.

On the receiving end as represented by FIG. 6b, when transport cells are received, the receiver 370 strips off the transport cell overhead OH (including the PCR), and sends the payload data to the buffer 372. The payload is then removed from the buffer 372 as PES packets, and the PES header is stripped off the packet at 374 with the PTS value being stored for later use as described below. The data is then decompressed at 376 (if it was originally compressed), and provided to the data sink 378.

In order to measure coding delay in accord with the methods of FIGS. 5b and 5c, a sink program clock which is preferably synchronized to the source program clock is generated by providing the PCR values stripped out of the transport cell overhead to a phase lock loop (PLL) 380. The phase lock loop includes a subtractor 382, a voltage controlled oscillator 384, and the sink program clock 386, with the output of the sink program clock 386 being provided to the subtractor 382 as feedback. With the provided PLL 380 at the receiver, the output of the voltage controlled oscillator 384 will be nominally the same frequency CLK as that of the source 350, and this clock is provided to the sink 378.

When the sink is about to display the data to which is associated the PTS value (e.g., the beginning of a video scan), the sink provides a control "tic" which causes a latch 388 to sample and latch the value of the sink program clock 386. The value of the PTS value (from 374), and the value of the latch are then provided to subtractor 390, with the difference between values representing the actual coding delay. As measured this way, the coding delay includes the encoding delay plus the decoding delay, but does not include channel delay. This may be understood by recognizing that the count of the sink program clock 386 is synchronized to the source program clock 360. Thus, the encoding delay (PTS - PCR) is already built into the sink program clock, and the additional delay in the decoding represented by the difference of PTS and the sink program clock value at the time of display is added to that built-in delay.

According to FIG. 5b, the coding delay (as output by the subtractor 390 of FIG. 6b) is applied to the audio signal in order to substantially synchronize the audio and video signals. Thus, the method of FIG. 5b generally assumes that the audio signal coding delay is essentially negligible. It will be appreciated, therefore, that with respect to the method of FIG. 5b, the audio presentation time manager 217 (FIG. 3) does not need to process the PTS information and does not need to generate a coding delay. Thus, FIG. 6b, as it relates to the audio signal, does not require the latch 388, or the subtractor 390. Rather, as indicated in FIG. 5b, the coding delay as determined by the video presentation time manager 238 (FIG. 3) and in accord with FIG. 6b, is provided to the DMA controller (FIG. 3) in order to appropriately delay the audio data in the buffer.

In attempting to account for channel delay differences in synchronizing the audio and video signals as suggested by FIG. 5c, it is necessary for both the audio and video presentation time managers to conduct coding delay determinations. Preferably, the audio and video subsystems will share a sample clock reconstruction portion of the logic; i.e., there will be only one source program clock which is used by both the video and audio source time managers, and only one sink program clock which is used by both the video and audio presentation time managers. While it does not matter whether the audio or video is used to convey the program clock reference (PCR), for purposes of discussion, it will be assumed that the video channel is used.

In principle, the differential delay between the audio and video signals can be measured by comparing corresponding audio and video PTS values as they are presented to the respective sinks. This, however, is an oversimplification due to the need to compensate for compression and decompression processing and the fact that audio and video packets will not occur at the same rate; nor will they have the PTS applied at corresponding points in time. In order to achieve a correct result, the sink program clock is used in order to adjust the raw PTS values to corresponding points in time before the delay comparison is made. To do this, the video coding delay measurement (as output by the subtractor 390) is made as discussed above (with reference to FIGS. 5b, 6a, and 6b), with the assumption that the video channel carries the PCR. The same technique is then applied to the audio PTS, with the output of the subtractor 390 providing not just the audio coding delay, but the coding delay plus any difference between the audio and video channels. In order to maintain audio/video synchronization, the audio buffer delay is then adjusted to make the audio delay (audio coding plus channel delta) equal to the video coding delay. In other words, the output of the subtractor 390 for the video presentation manager is compared with (subtracted from) the output of the subtractor 390 for the audio presentation manager, and the difference is applied as additional delay to the audio signal.

Figure 7:
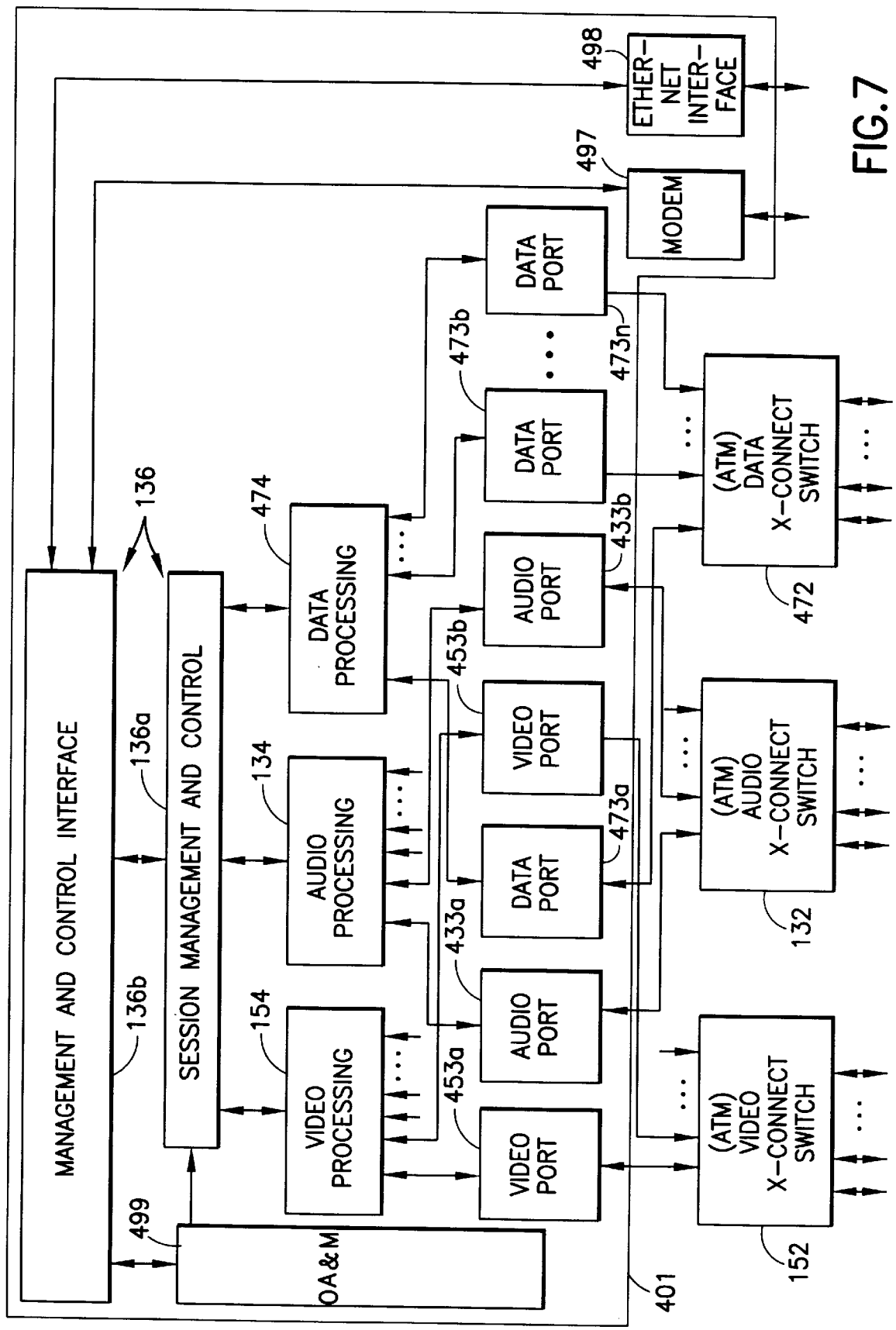
FIG. 7 is a high level block diagram of the an audio/video bridge shown in FIG. 2b.

Turning now to FIG. 7, the basic architecture of the audio and video bridge 130/150 described above with reference to FIGS. 2a and 2b is shown (with like numerals indicating like parts). The audio and video bridge 130/150 includes a cross-connect switching section including an audio cross-connect ATM switch 132, a video cross-connect ATM switch 152, and a data cross-connect ATM switch 172. If video processing is not required, the video cross-connect switch 152 routes the video data, and does not forward it to the processing section 401 of the bridge. However, if video processing such as quad-split or continuous presence is required, the switched video data is forwarded through the video ports 453a, 453b, . . . to the video processing unit 154 which is directly under the control of the session management and control block 136a, and indirectly under the control of the management and control interface 136b.

The audio information is likewise cross-connected by audio switch 132, and forwarded to the processing section 401 for processing. Thus, the audio information is received by audio ports 433a, 433b, . . . , to the audio processing unit 134 which is directly under the control of the session management and control block 136a, and indirectly under the control of the management and control interface 136b. Typically, in a multipoint conference, the audio information received from the different audio ports 433 involved in the conference will be summed, or weighted and summed, and then the source audio signal of the destination will be subtracted from the sum. The weighting of information, and other control of the conference is provided to the audio processing block 134 by the controller 136. That information, in turn, is obtained from the data processing unit 474 which receives the command through the data ports 473.

The modem 497, and Ethernet link 498 are external connections which permit a system controller (not shown) to access the management and control interface 136*b*. The operations, administration and maintenance section (OA&M) 499 is involved in usage statistics collection, system configuration, and error or message logging.

Those skilled in the art will appreciate that other data may likewise be switched by a cross-connect switch 472, and provided for processing to the data processing block 474 via the data ports 473*a*, 437*b* . . . , 473*n*.

There have been described and illustrated herein methods, apparatus, and systems for transporting multimedia conference data streams through a transport network, where the audio and video data streams are handled separately (i.e., not multiplexed). While particular embodiments of the invention have been described, it is not intended that the invention be limited thereto, as it is intended that the invention be as broad in scope as the art will allow and that the specification be read likewise. Thus, while the invention requires that the audio and video data streams be handled and processed separately, it will be appreciated that it may be appropriate in some circumstances to time division multiplex the audio and video data streams generated at a source onto a single network interface "wire" (i.e., a "local" channel segment); provided of course that the data is divided into separate frames or cells so that the actual channels (VCC) for the audio and video are different. In other words, while the routing of the audio and video data streams may cause the data streams at certain times to be on the same physical connection, the audio and video data streams must be capable of being routed and switched independently. It will also be appreciated that while four different synchronization mechanisms for synchronizing the audio and video data streams at the terminal have been described, other synchronization mechanisms could be utilized. In fact, different synchronization mechanisms could use parts of one or more of the disclosed mechanisms. Also, while the codec of FIG. 3 was described with reference to a specific architecture, and with reference to specific types of processing, it will be appreciated that other architectures could be utilized. Thus, while JPEG video compression and decompression processing was described, it will be appreciated that other compression techniques such as MPEG could be utilized. It will therefore be appreciated by those skilled in the art that yet other modifications could be made to the provided invention without deviating from its spirit and scope as so claimed.

I claim:

1. A telecommunications multimedia conferencing system for use in conjunction with an ATM network which carries audio and video data streams, said conferencing system comprising:

a plurality of multimedia terminals coupled to the ATM network, each of said plurality of said multimedia terminals including codec means for interfacing with said ATM network, for generating an outgoing audio data stream and an outgoing video data stream separate from said audio data stream, and for receiving and substantially synchronizing separate but related incoming audio data and incoming video data streams, wherein audio data and video data streams being sent from a first of said plurality of multimedia terminals to a second of said plurality of multimedia terminals are sent over different defined channels which are separately routed through the ATM network.

2. A telecommunications multimedia conferencing system according to claim 1, wherein:

said plurality of multimedia terminals comprises at least three multimedia terminals.

3. A telecommunications multimedia conferencing system according to claims 1, further comprising:

an audio terminal coupled to the ATM network by a line of insufficient bandwidth to receive said outgoing video data stream, said audio terminal including an audio codec means for interfacing with the ATM network and for generating an outgoing audio data stream and for receiving an incoming audio data stream.

4. A telecommunications multimedia conferencing system according to claim 3, further comprising:

audio bridge means for receiving said audio data streams from said plurality of multimedia terminals and from said audio terminal, for audio mixing said audio data streams, and for sending mixed audio data streams to said at plurality of multimedia terminals and to said audio terminal, each mixed audio data stream being received at a respective said codec means of a respective one of said plurality of multimedia terminals and said audio terminal as said incoming audio data stream.

5. A telecommunications multimedia conferencing system according to claim 4, further comprising:

video switch means for routing video data streams received from said plurality of multimedia terminals.

6. A telecommunications multimedia conferencing system according to claim 2, further comprising:

audio bridge means for receiving said audio data streams from said at least three multimedia terminals, for audio mixing said audio data streams, and for sending mixed audio data streams to said at least three multimedia terminals, each mixed audio data stream being received at a respective said codec means of a respective one of said at least three multimedia terminals as said incoming audio data stream.

7. A telecommunications multimedia conferencing system according to claim 2, further comprising:

video switch means for routing video data streams received from said at least three multimedia terminals.

8. A telecommunications multimedia conferencing system according to claim 1, wherein:

said codec means for receiving and substantially synchronizing separate but related incoming audio and incoming data streams includes means for delaying said incoming audio data stream.

9. A telecommunications multimedia conferencing system according to claim 8, wherein:

said means for delaying said incoming audio data stream comprises means for delaying said incoming audio data stream by a predetermined time interval.

10. A telecommunications multimedia conferencing system according to claim 9, wherein:

said predetermined time interval is approximately 65 milliseconds.

11. A telecommunications multimedia conferencing system according to claim 8, wherein:

said means for delaying said incoming audio data stream comprises means for inserting a first video time stamp into said outgoing video data stream, means for inserting a local clock indicator into said outgoing video data stream, means for generating a receiving clock from said local clock indicator, means for recovering said first video time stamp, means for comparing said first video time stamp to an indication of said receiving clock to yield a delay indication, and means for using said delay indication to delay presentation of said audio data stream.

12. A telecommunications multimedia conferencing system according to claim 8, wherein:

said means for delaying said incoming audio data stream comprises means for inserting a first video time stamp into said outgoing video data stream, means for inserting a first audio time stamp into said outgoing audio data stream, means for inserting a local clock indicator into one of said outgoing video and audio data streams, means for generating a receiving clock from said local clock indicator, means for recovering said first video time stamp, means for recovering said first audio time stamp, means for comparing said first video time stamp to an indication of said receiving clock to yield a first delay indication, means for comparing said first audio time stamp to an indication of said receiving clock to yield a second delay indication, means for comparing said first and second delay indications to provide a third delay indication, and means for using said third delay indication to delay presentation of said audio data stream.

13. A multimedia terminal coupled to and for use in conjunction with an ATM network, the ATM network being in turn coupled to at least one other multimedia terminal, said multimedia terminal comprising:

a) audio means for generating a local audio signal;

b) video means for generating a local video signal; and c) codec means for interfacing with the ATM network, said codec means coupled to said audio means and to said video means and including encoding means for receiving said local audio data and generating therefrom an outgoing audio data stream which is routed on a first defined channel, and for receiving said local video data and generating therefrom an outgoing video data stream separate from said audio data stream and which is separately routed on a second defined channel distinct from said first defined channel through the ATM network, and decoding means for receiving and substantially synchronizing separately routed but related incoming audio and incoming video data streams which are received over different defined channels of the ATM network and for presentation to said audio means and said video means.

14. A multimedia terminal according to claim 13, wherein:

said codec means for receiving and substantially synchronizing separate but related incoming audio and incoming data streams includes means for delaying said incoming audio data stream.

15. A multimedia terminal according to claim 14, wherein:

said means for delaying said incoming audio data stream comprises means for delaying said incoming audio data stream by a predetermined time interval.

16. A multimedia terminal according to claim 15, wherein:

said predetermined time interval is approximately 65 milliseconds.

17. A multimedia terminal according to claim 14, wherein:

said means for delaying said incoming audio data stream comprises means for inserting a first video time stamp into said outgoing video data stream, means for inserting a local clock indicator into said outgoing video data stream, means for generating a receiving clock from said local clock indicator, means for recovering said first video time stamp, means for comparing said first video time stamp to an indication of said receiving clock to yield a delay indication, and means for using said delay indication to delay presentation of said audio data stream.

18. A multimedia terminal according to claim 14, wherein:

said means for delaying said incoming audio data stream comprises means for inserting a first video time stamp into said outgoing video data stream, means for inserting a first audio time stamp into said outgoing audio data stream, means for inserting a local clock indicator into one of said outgoing video and audio data streams, means for generating a receiving clock from said local clock indicator, means for recovering said first video time stamp, means for recovering said first audio time stamp, means for comparing said first video time stamp to an indication of said receiving clock to yield a first delay indication, means for comparing said first audio time stamp to an indication of said receiving clock to yield a second delay indication, means for comparing said first and second delay indications to provide a third delay indication, and means for using said third delay indication to delay presentation of said audio data stream.

19. A method for conducting a multimedia multipoint conference utilizing at a plurality of multimedia terminals coupled to the ATM network, each said multimedia terminal including codec means for interfacing with the ATM network and for generating an outgoing audio data stream and an outgoing video data stream, and for receiving an incoming audio data stream and an incoming video data stream, said method comprising:

a) for each multimedia terminal, routing the outgoing audio data stream for that multimedia terminal and the outgoing video data stream for that multimedia terminal onto separate defined channels in the ATM network; and b) for each multimedia terminal, receiving from the ATM network the separate but related incoming audio data stream and incoming video data stream, and substantially synchronizing the incoming audio data stream with the related incoming video data stream prior to presentation.

20. A method according to claim 19, wherein:

said conference includes at least three multimedia terminals, the ATM network includes an audio bridge means for receiving said audio data streams from said at least three multimedia terminals, and said method further comprises mixing said audio data streams from said at least three multimedia terminals at the audio bridge means, and for sending mixed audio data streams to said at least three multimedia terminals as the incoming audio data stream.

* * * * *